United States Patent
Schenk et al.

(10) Patent No.: US 6,204,753 B1
(45) Date of Patent: Mar. 20, 2001

(54) COLLISION PROTECTION DEVICE FOR THE PROTECTION OF PROJECTING MOTOR VEHICLE PARTS

(75) Inventors: Joachim Schenk, Hemmingen; Guenter Haderer, Buehl; Arno Faust, Ofterdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/256,835

(22) Filed: Feb. 24, 1999

(30) Foreign Application Priority Data

Feb. 26, 1998 (DE) ............................................. 198 08 181

(51) Int. Cl.$^7$ ...................................................... B60Q 1/00
(52) U.S. Cl. ........................ 340/435; 340/903; 340/932.2; 359/841
(58) Field of Search ..................................... 340/903, 901, 340/904, 425.5, 435, 436, 932.2; 307/10.1; 359/841, 843; 248/479

(56) References Cited

U.S. PATENT DOCUMENTS

| | | | |
|---|---|---|---|
| 4,786,156 | * 11/1988 | Kotani et al. | 248/479 |
| 4,911,545 | * 3/1990 | Miller | 350/604 |
| 5,306,953 | 4/1994 | Weiner | 307/10.1 |
| 5,497,273 | * 3/1996 | Kogita et al. | 359/841 |
| 5,640,281 | 6/1997 | Cho | 359/841 |

FOREIGN PATENT DOCUMENTS

| | | |
|---|---|---|
| 91 08 155 | 11/1991 | (DE) . |
| 41 14 016 | 11/1992 | (DE) . |
| 41 19 579 | 12/1992 | (DE) . |
| 196 23 469 | 1/1997 | (DE) . |
| 5-301541 | 11/1993 | (JP) . |
| 08207665 | 8/1996 | (JP) . |
| 08091125 | 9/1996 | (JP) . |

* cited by examiner

Primary Examiner—Brent A. Swarthout
(74) Attorney, Agent, or Firm—Kenyon & Kenyon

(57) ABSTRACT

A device for collision protection of projecting parts of motor vehicles has a controllable actuating mechanism at least for retracting and/or folding the projecting vehicle parts. At least one distance detection or proximity sensor, which is functionally connected to the actuating mechanism, is provided in the vehicle to detect the distance and/or the approach of an object with respect to the respective projecting vehicle part, and the actuating mechanism retracts or folds the respective vehicle part upon a detection signal delivered by the sensor and indicating a collision hazard with the object.

18 Claims, 1 Drawing Sheet

COLLISION PROTECTION DEVICE FOR THE PROTECTION OF PROJECTING MOTOR VEHICLE PARTS

FIELD OF THE INVENTION

The present invention relates to a device for the protection of projecting parts of motor vehicles, which has a controllable actuator mechanism at least for retracting and/or folding the projecting motor vehicle part.

BACKGROUND INFORMATION

In particular, projecting parts on the sides of motor vehicles, such as side view mirror housings, are often damaged or even ripped off by collisions with lateral objects during travel or parking of the vehicle. In order to avoid this, motor vehicles such as passenger cars and utility vehicles sold today are equipped with foldable side view mirror housings. The side view mirror housing is folded, for example, when the driver presses a button. If the driver's attention is distracted by other things, for example, by parking in narrow spaces or during the normal operation of the vehicle, it may still occur that a lateral obstacle damages or rips off the side view mirror housing. In addition, it is customary to fold the side view mirror housing manually or by pressing a button after parking.

SUMMARY OF THE INVENTION

An object of the present invention is to provide a collision protection device to protect projecting parts of a motor vehicle that react automatically to a collision hazard and reliably fold or retract the projecting motor vehicle part, extending it automatically when there is sufficient distance to the collision hazard with no intervention on the part of the driver.

According to an exemplary embodiment of the present invention, the projecting motor vehicle part, in particular the side view mirror housing, is to be folded automatically even after the vehicle has been parked.

To achieve this object, in a collision protection device according to the present invention, at least one distance detection sensor or proximity sensor, which is functionally connected to the actuating mechanism and detects the distance and/or proximity of an object constituting a collision hazard to a projecting motor vehicle part, is provided on the motor vehicle, and the actuating mechanism retracts or folds the respective motor vehicle part upon receiving a detection signal delivered by the sensor and indicating a collision hazard with such an object.

When parts of a motor vehicle, as in the case of side view mirror housings, project on both sides of the motor vehicle, it is preferable, according to the present invention, that a separate sensor be assigned to each projecting motor vehicle part. The respective sensor can be integrated in the projecting motor vehicle part.

In this manner, spaces or objects in or between which motor vehicles having projecting parts are at rest or move during travel are scanned with one or more distance sensing or proximity sensors, for example, forward, backward, sideways, up, and/or down, or also overlapping.

If there is a danger that a projecting motor vehicle part may collide with an object or body, this motor vehicle part is fully or partially folded or retracted according to the present invention.

According to a preferred embodiment of the collision protection device according to the present invention, a control device provided in the vehicle, which activates the actuating mechanism, is connected to the sensor(s), and is designed to determine the speed with which the object or body approaches the respective projecting part. The control device controls the folding or retraction speed as a function of the respective speed of approach.

The control device can also determine the retraction or folding procedure of the respective vehicle part(s) as a function of parameters such as vehicle speed, direction of travel, steering angle, road condition, parking conditions of the vehicle, etc. In that case, the retraction or folding speed of the respective actuating mechanism can be controlled as a function of these parameters.

In another preferred embodiment of the present invention, the control device controls the actuating mechanism to extend or fold out the projecting vehicle part after it has recognized from the control signal(s) that there is sufficient distance to the collision hazard.

In a further preferred embodiment of the collision protection device according to the present invention, it is used to determine the distance or the approach of an object to the side view mirror housing of the vehicle. In this case it is advantageous if the sensors assigned to the respective side view mirror housings are integrated in those side view mirror housings and their scanning areas are oriented forward. In addition, sensors with scanning areas oriented backward can be provided for collision protection when moving in reverse.

As an alternative, suitable existing distance or proximity sensors can be used if such sensors are already installed in or on the vehicle. Particularly suitable are proximity sensors whose scanning areas intersect and are basically oriented forward. Furthermore, the sensor signals can be combined with existing door contacts, ignition key contacts, or the like, whereby automatic parking, i.e., folding of the side view mirror housing when the vehicle is parked, can be achieved.

In addition to the actuating mechanism already present for the side view mirror housing, the actuating mechanism can have a rapid actuator, having a spring mechanism with a pre-stressed spring, which is used for rapidly folding/moving the projecting vehicle part, i.e., the respective side view mirror housing, and the existing servo motor can be used as a slow actuator for folding out the side view mirror housing into its projecting position, prestressing at the same time the spring of the rapid actuator.

In another embodiment of the present invention, the control device can inform the driver about the folding/retraction of the side view mirror housing via an existing or an additional warning device.

DETAILED DESCRIPTION

Figure 1:
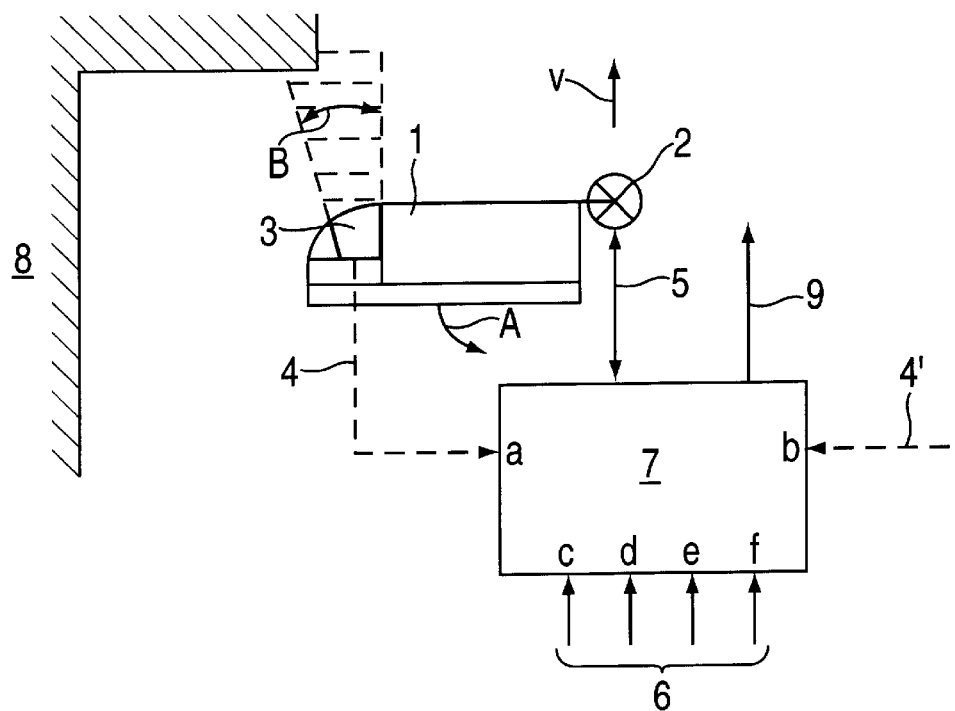
FIG. 1 shows a first embodiment according to the present invention of the collision protection device which protects the side view mirror housing from a collision.

FIG. 1 schematically shows, using a block diagram, a collision protection device according to the present invention, used, for example, for the collision protection of a folding side view mirror housing 1 using an actuating mechanism 2, which, e.g., may be a conventional electrically powered actuator. Although only one side view mirror housing is illustrated in FIG. 1, the vehicle usually has a second similar folding side view mirror housing 1 on the opposite side. A distance detection or proximity sensor 3, which detects the distance or approach of an object, for example, a wall 8 and generates the corresponding detection signal 4, is integrated in side view mirror housing 1. The scanning area (shaded with dashed lines) is preferably essentially oriented forward (arrow V) and the detection angle is labeled B. Of course, sensor 3 can be located or oriented so that its scanning area extends sideways and forward, i.e., in the direction of travel V, as well as backward. A control device 7 receives detection signal 4 from the distance detection or proximity sensor 3 at an input a and, optionally, a second detection signal 4' from a similar sensor (not illustrated), which is integrated in a side view mirror housing (not illustrated) on the opposite side.

Control device 7 may receive additional signals via door contact signals, ignition key signals, vehicle speed, direction of travel, steering angle, road condition, etc., at inputs c, d, e, f. Control device 7 sends an actuating signal 5 to actuating mechanism 2 and may also receive an acknowledgment signal or angular signal from actuating mechanism 2. The folding mechanism is labeled A.

Control device 7 can be a digital microprocessor device already present in the vehicle. As an alternative, control device 7 can also be a separate control device, for example, a microprocessor controller, specifically designed for the functions according to the present invention.

Control device 7 determines, at least from the signals 4 and 4' received at its inputs a and b, respectively, whether there is a collision hazard of side view mirror housing 1 with object 8. In addition, control device 7 may also be designed to determine the speed of approach of object 8 to projecting side view mirror housing 1. If control device 7 has detected a collision hazard of side view mirror housing 1 with object 8, it sends an actuating signal 5 to actuating mechanism 2 to fold side view mirror housing 1. This is performed, in principle, automatically, without intervention on the driver's part.

Furthermore, control device 7 can also control the folding speed of side view mirror housing 1 as a function of the approach speed determined by sending an actuating signal 5 corresponding to this folding speed to actuating mechanism 2.

Other signals 6 sent to inputs c through f of control device 7 can be used for determining the collision hazard, the folding speed of side view mirror housing 1 and for determining a parking state of the vehicle. Such signals can provide or signal the vehicle speed, the direction of travel, the steering angle, the road condition, door contact or ignition key switching signals, or ambient conditions, as well as the use or location of the vehicle.

In addition, the control device can re-extend the side view mirror housing again when it has recognized from the sensor signal received at its input that the collision hazard is no longer present.

Figure 2:
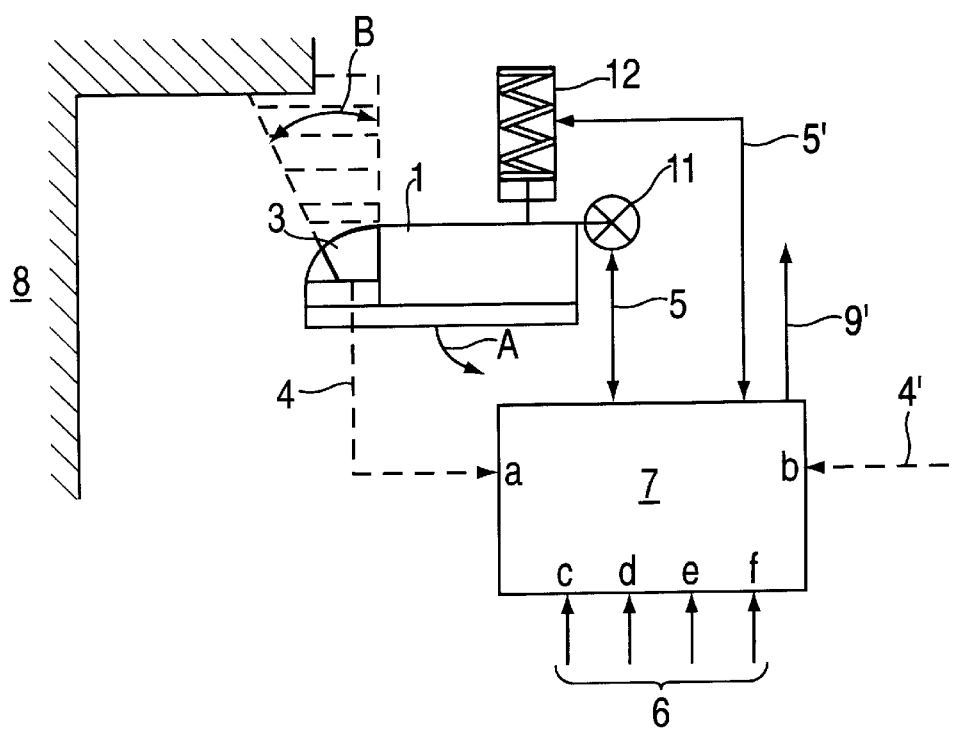
FIG. 2 shows a second embodiment of the collision protection device according to the present invention.

In the modified exemplary embodiment of FIG. 2, the actuating mechanism has a slow actuator 11, which may be motor-driven, for example, which is used for normal, for example, manually actuated folding-in and folding-out of side view mirror housing 1, and a rapid actuator 12, reinforced by the force of a pre-stressed spring element, which is parallel to slow actuator 11 and receives an actuating signal 5 from control device 7. In the case of a collision hazard, the spring force of the spring located in rapid actuator 12 is used for rapid folding of side view mirror housing 1, which is extended automatically by the normal, motor-driven slow actuator 11 when the distance to a collision hazard is sufficiently great; the pre-stress spring of quick actuator 12 is restressed again at this time.

In FIGS. 1 and 2, only output line 9 of control device 7 indicates that the control device can activate a warning device installed in the vehicle, for example, on the dashboard, to emit an acoustic or visual warning signal in the case of a collision hazard.

Sensors 3 installed in side view mirror housings 1 according to FIGS. 1 and 2 and the detection results obtained from their signals in control device 7 can also be used for additional functions. These include, for example, a door opening warning signal or a door opening blocking function when an object is too close to the door to be opened.

Instead of the special sensors in the side view mirror housings, appropriate sensors already existing in the vehicle can also be used. It is also possible to use several sensors having overlapping scanning areas.

What is claimed is:

1. A device for protecting at least one projecting part of a motor vehicle from a collision with an object, comprising:
at least one sensor detecting at least one of a distance and an approach of the object with respect to the at least one projecting part, the at least one sensor providing a detection signal which is indicative of a collision hazard of the at least one projecting part with the object; and
at least one controllable actuating mechanism functionally coupled to the at least one sensor, the at least one actuating mechanism performing at least one of a retracting operation and a folding operation on the at least one projecting part as a function of the detection signal.

2. The device according to claim 1, wherein a particular sensor of the at least one sensor is assigned to each of the at least one projecting part.

3. The device according to claim 2, wherein a scanning area of the at least one sensor is oriented substantially forward in a travel direction of the vehicle.

4. The device according to claim 3, wherein the at least one sensor is integrated in the at least one projecting part.

5. The device according to claim 1, further comprising:
a control device activating the at least one actuating mechanism, the control device coupled to the at least one sensor and situated in the vehicle, the control device determining a velocity of the object with respect to the at least one projecting part, the control device controlling one of a retraction speed and a folding speed of the at least one actuating mechanism as a function of the velocity.

6. The device according to claim 5, wherein the control device controls at least one of the retracting operation and the folding operation as a function of at least one parameter.

7. The device according to claim 6, wherein the at least one parameter includes at least one of a parked status of the vehicle, a further speed of the vehicle, a travel direction of the vehicle, a steering angle and a road condition.

8. The device according to claim 6, wherein, when the control device receives at least one signal and the vehicle is parked, the control device performs at least one of the retracting operation and the folding operation.

9. The device according to claim 8, wherein the at least one signal includes at least one of a door contact signal and an ignition key signal.

10. The device according to claim 6, wherein the control device controls at least one of the retraction speed and the folding speed as a function of the at least one parameter.

11. The device according to claim 5, wherein the at least one sensor detects a further distance between the object and a side view mirror housing, the side view mirror housing being one of retractable and foldable by a corresponding actuating mechanism of the at least one actuating mechanism.

12. The device according to claim 11, wherein the at least one sensor is assigned to and integrated in the side view mirror housing.

13. The device according to claim 12, wherein, when the collision hazard is detected, the control device activates the corresponding actuating mechanism to perform at least one of the folding operation and the retracting operation on the side view mirror housing at a first speed, the first speed being greater than a second speed, the second speed being a speed of a normal manual performance of at least one of the folding operation and the retracting operation.

14. The device according to claim 5, wherein, when a predetermined distance is detected between the object and the at least one projecting part and when, immediately after the predetermined distance is detected, the vehicle is unparked, the control device automatically performs the retraction operation to unfold the at least one projecting part.

15. The device according to claim 13, wherein the at least one actuating mechanism includes a slow actuator and a quick actuator, the control device utilizing the slow actuator for the normal manual performance of at least ore of the folding operation and the retracting operation, the control device utilizing the quick actuator, when the collision hazard is detected, to perform the folding operation and the retracting operation, a force of the quick actuator being enhanced by a pre-stressed spring element which is situated in parallel with the slow actuator.

16. The device according to claim 15, wherein the slow actuator is a motor-driven actuator.

17. The device according to claim 15, wherein the slow actuator is a hydro-pneumatically driven actuator.

18. The device according to claim 5, wherein the control device generates one of an acoustic warning signal and a visual warning signal using a warning device of the vehicle.

* * * * *